Patented Jan. 1, 1929.

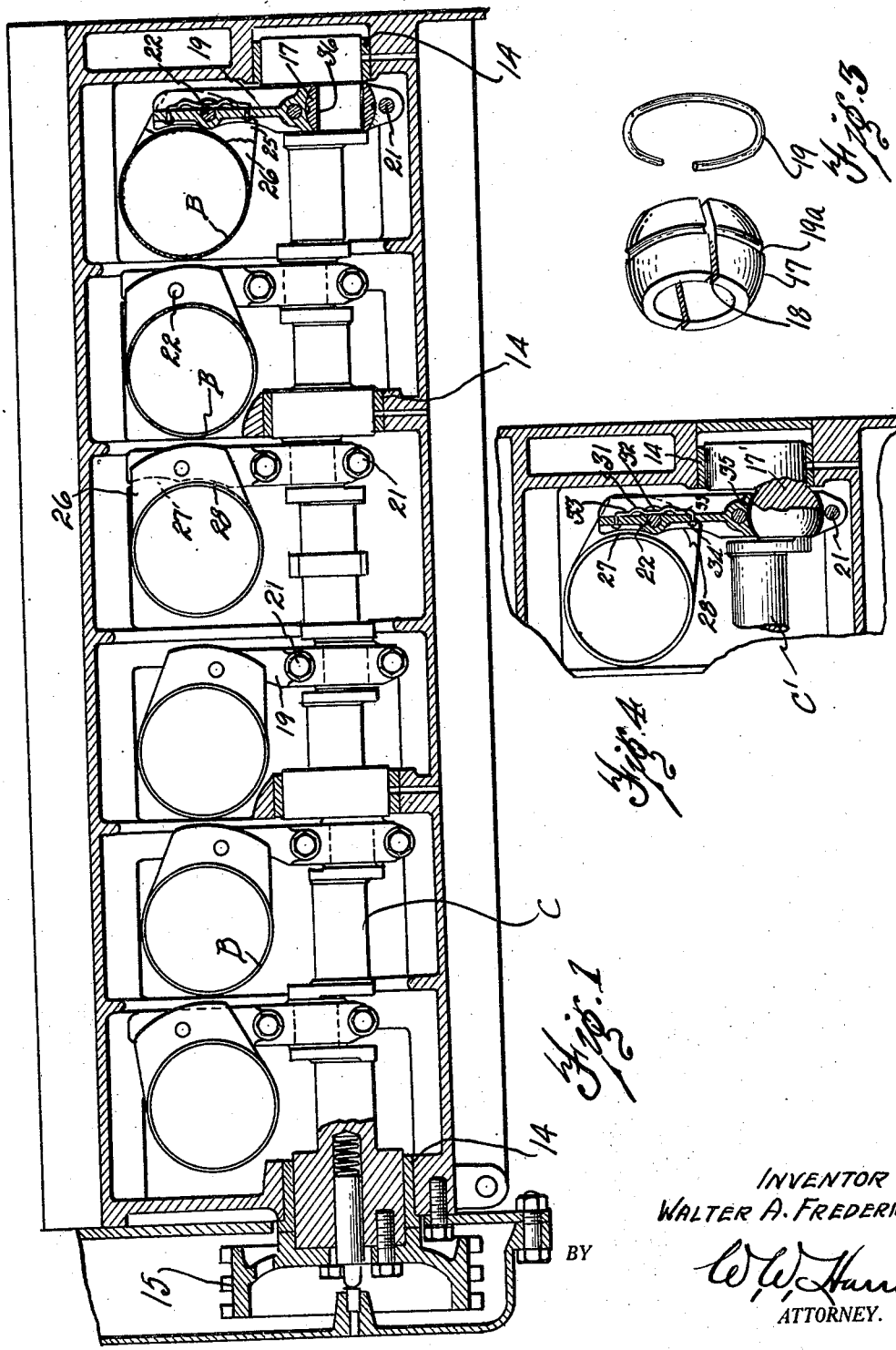

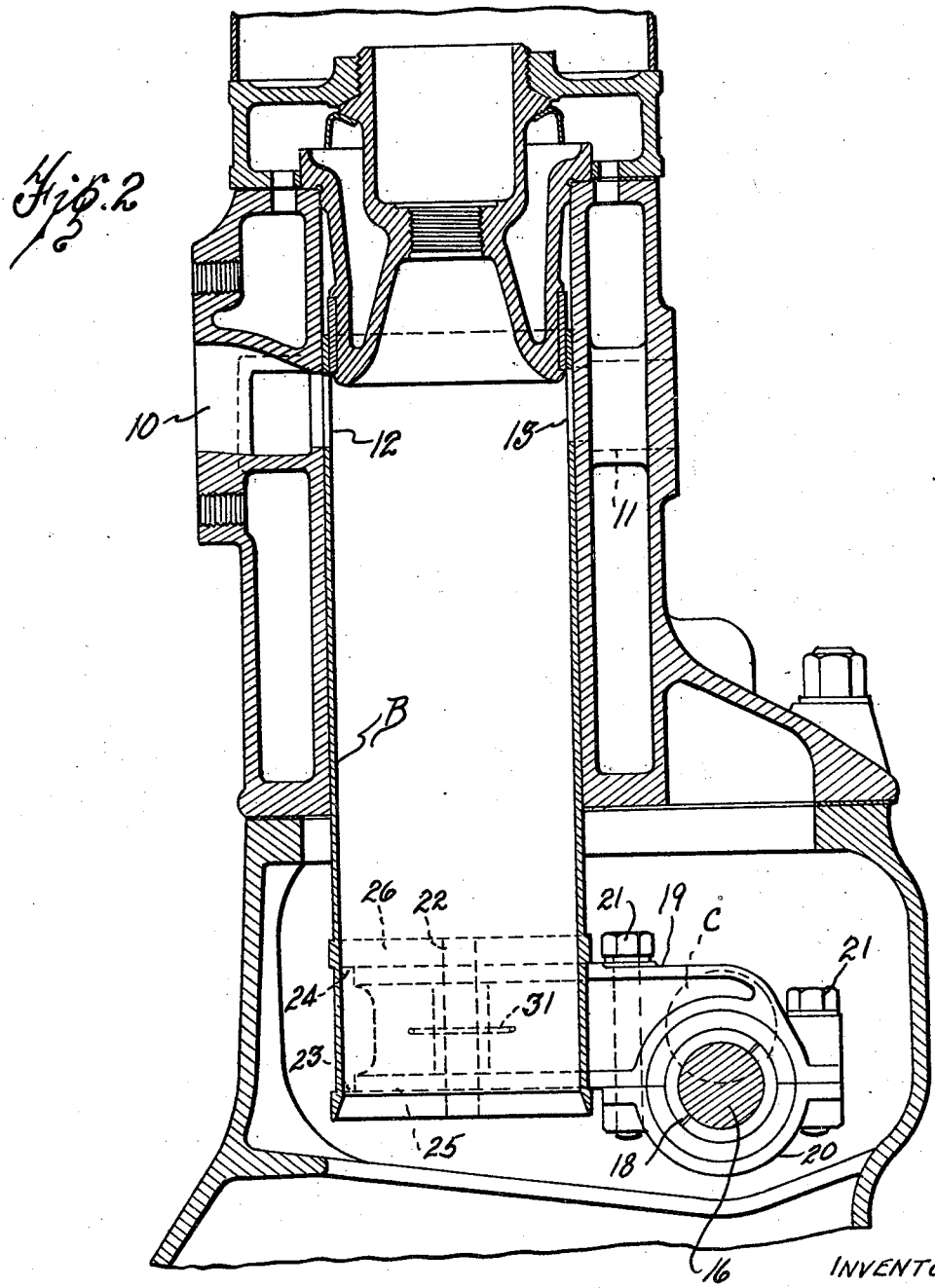

1,697,560

UNITED STATES PATENT OFFICE.

WALTER A. FREDERICK, OF DETROIT, MICHIGAN, ASSIGNOR TO CONTINENTAL MOTORS CORPORATION, OF DETROIT, MICHIGAN, A CORPORATION OF VIRGINIA.

SLEEVE-VALVE-ACTUATING MECHANISM.

Application filed March 14, 1927. Serial No. 175,333.

This invention relates to internal combustion engines and refers more particularly to an improved drive mechanism for sleeve valves.

Heretofore in sleeve valve drive mechanisms of this general character difficulty has been experienced in obtaining and maintaining true alignment of the sleeve valve mechanism. Any inaccuracy caused excessive strain on the link, sleeve, and other parts resulting in excessive wear and oftentimes breakage of the mechanism. In this general type of driving mechanism it was customary to provide a crank lay-shaft extending parallel with the engine crankshaft, the sleeves being operated by links each slidably connected at one and with the crankshaft and extending substantially between adjacent cylinders for connection to a sleeve. In order to reduce the bending tendency of the link due to the rotational component of the sleeve valve travel it was customary to arrange the sleeves with an offset travel, i. e. travel more to one side of the plane of the cylinder axes and thereby reduce the link centers or the distance from the cranks to the points of connection of the links to the sleeves. However, such an arrangement was not entirely successful in practice for, although the link centers was reduced, an increased loading was imposed on the valve shaft crank pin and slidable link boss due to the increased lateral travel of the link, which in turn was caused by realizing a relatively greater component of the rotational movement of the sleeve in the direction of the valve layshaft.

In my invention I have provided means for overcoming the objections noted above in this general type of driving mechanism. In part my invention consists of a spherical bearing carried by the crank layshaft, either integral therewith or otherwise, the driving link having no sliding movement axially along the crank layshaft. A still further feature of my invention resides in the provision of a sleeve valve driving mechanism constructed to afford a large amount of bearing area between the driving link and sleeve valve as well as permitting a relatively close and compact arrangement of the engine cylinders, and close positioning of the sleeve pin to the sleeve.

A further feature of my invention resides in a novel combination of materials for the sleeve operating mechanism, whereby the mechanism will not unduly wear or fail under relatively long and severe usage.

With the above and other objects in view my invention consists in the novel combination and arrangement of parts more particularly hereinafter described and shown.

In the drawings in which like reference characters represent corresponding parts, Fig. 1 represents a sectional plan view through an engine showing my sleeve valve drive mechanism, Fig. 2 is a sectional elevation view through one of the engine cylinders, Fig. 3 a perspective view showing the crank ball and circlip, and Fig. 4 is a fragmentary view corresponding to Fig. 1 illustrating a modification of the spherical bearing feature of my invention.

In the drawings reference character A represents the engine having one or more cylinders each provided with inlet and exhaust ports 10 and 11 of usual or other preferred construction. For controlling the ports of each cylinder, a sleeve valve B is provided, preferably located within the cylinder as shown in Fig. 2 and provided with ports 12 and 13 adapted to cooperate with the cylinder ports 10 and 11 for controlling the intake and exhaust. The particular construction and arrangement of cylinder and exhaust ports per se forms no part of my invention.

It is customary and desirable in the single sleeve valve type of internal combustion engine to operate the sleeve with a combined reciprocating and oscillating movement whereby a point of the sleeve will move in a closed path with respect to the cylinder. To this end my invention includes and I have so provided, as valve layshaft C rotatably mounted in bearings 14 in a position parallel with the engine crank shaft (for a multicylinder engine), the layshaft being suitably driven as by a chain wheel or gear 15 at half engine speed for a four stroke cycle engine.

For driving the sleeves, as aforesaid from the layshaft, the latter is provided with spaced cranks 16, having mounted thereon the spherical bearings 17 preferably split as at 18 for convenience of assembly. The split portions of the bearings may, if desired be held in position during assembly by any means such as the resilient circlips 19 engageable in circumferential grooves 19ª. Surrounding each bearing 17 is an end of a driving link 19, this end having a bearing cap 20 secured to the complementary main bearing portion of link 19 as by threaded bolts 21. For strength and reduction in weight the links 19 may be I-shaped in cross section. The inner ends of the links are pivotally secured by a pivot pin 22 between the inner bearing faces 23 and 24 of the sleeve actuating projections 25 and 26. Instead of forking the sleeve projections to receive the actuating link I may fork the actuating link to receive an actuating projection therebetween as will be readily understood.

One of the features of my invention resides in forming the face of the link 19 which is adjacent the sleeve, with accurate cut away or indented portions 27 and 28 respectively substantially conforming with the outer curvature of the sleeve when the link is in the opposite limits of its travel in a direction transverse to the layshaft. Such construction permits pivot pin 22 to be located relatively closely to the sleeve valve and at the same time retains a relatively large bearing area between the link and the faces of the projections 25 and 26. The links 19 thus have a combined motion consisting of movement axially of the sleeve in parallel planes and movement transversely to the layshaft. With my invention it is possible to provide a rigid link, the point of connection to the layshaft serving the double purpose of actuating the link and also permitting universal movement of the link end to compensate for the arcuate path of travel of the point 22 as the latter oscillates about the sleeve axis.

In Fig. 4 I have illustrated an improved manner of locating the pivot pin 22 with respect to the link 19 and sleeve projections 25 and 26. I have formed the link with a boss slotted at 32 to receive a securing member 31. The pin 22 is also slotted either circumferentially or tangentially as shown in Figs. 1 and 4 to receive the member 31 which may conveniently take the form of a bar or wire. This member 31 is preferably formed with portions 33 bent to contact with the web of link 19 whereby support is provided for riveting over the inturned ends 34 which are passed through apertures in the link web. Thus, means is provided, free from interference with the sleeve valve or crankcase for locating the pin 22 and preventing its displacement.

Instead of constructing the spherical bearing 17 separate from the layshaft C, I also contemplate making these parts integrally, i. e. as shown in Fig. 4 the spherical bearing 17' may be formed integrally with the layshaft C', the latter carrying the spherical bearings as in Fig. 1.

With the view of resisting undue wear under long and severe usage of the engine, I have devised a novel combination of materials for the various parts, several of these combinations being given in tabulated form as follows:

Materials.

| Part | 1 | 2 | 3 | 4 |
|---|---|---|---|---|
| Sleeve B | C. I. | C. I. | C. I. | Steel. |
| Pin 22 | C. H. S. | C. H. S. | C. H. S. | C. H. S. |
| Link 19 | Duralumin with chromium plated faces. | Steel with babbitt lined spherical bore, 35. | Steel | Duralumin. |
| Bearing 17 | Steel with babbitt lined plain bore, 36. | Steel with babbitt lined plain bore, 36. | Bronze | Steel with babbitt lined plain bore, 36. |
| Layshaft C | Steel | Steel | Steel | Steel. |

In the above table the following abbreviations are used:
C. I. = cast iron.
C. H. S. = case hardened steel.

While the combination of materials shown in Table 1 and Table 2 is preferred, I do not limit myself in such particulars since equivalent materials may be used if so desired. I have discovered that the combinations of materials shown are peculiarly adapted to meet the conditions existing in the drive mechanism of this general character. It is also apparent that the selection of materials is entirely independent from the other features of my invention as described and claimed.

Various changes and modifications may be resorted to without departing from the spirit or scope of my invention as shown, described, and claimed.

What I claim as my invention is:

1. An internal combustion engine comprising a ported cylinder, a sleeve valve ported for cooperation with the cylinder ports, a layshaft adapted to be driven in a predetermined timed relation with the engine speed, said layshaft having a crank, a spherical bearing carried by the crank immovable axially of the crank, a link member connected at one end with the sleeve and having its other end formed with a spherical socket segment adapted to receive a portion of the spherical bearing, a complementary segmental bearing cap adapted to receive a second portion of the spherical bearing, and means securing the cap to the link.

2. An internal combustion engine comprising a ported cylinder, a sleeve valve ported for cooperation with the cylinder ports, a layshaft adapted to be driven in a predetermined timed relation with the engine speed, said layshaft having a crank, a spherical bearing carried by the crank immovable axially of the crank, a link member connected with the sleeve and having its other end formed with a spherical socket segment adapted to receive a portion of the spherical bearing, a complementary segmental bearing cap adapted to receive a second portion of the spherical bearing, and means securing the cap to the link so as to form with the said spherical socket portion a spherical socket substantially enclosing the spherical bearing permitting universal movement of one end of the link.

3. An internal combustion engine of the character described comprising a ported cylinder, a sleeve valve ported for cooperation with the cylinder ports, and means for imparting to the sleeve a combined reciprocating and oscillating movement, said means including a layshaft, a crank carried by the layshaft, a spherical bearing carried by the crank fixed against movement axially thereof and means operated by the crank bearing and connected to the sleeve for imparting the aforesaid movement to the sleeve from the layshaft.

4. A sleeve valve engine comprising a cylindrical sleeve valve formed with a driving projection, a layshaft, a link member extending substantially tangentially of the sleeve valve, said link member connecting the layshaft and sleeve projection, driving means for the layshaft for imparting an oscillatory movement to the sleeve about its axis, the portion of said link member nearest the sleeve valve being formed with arcuate recesses spaced longitudinally of the link member.

5. A sleeve valve engine comprising a cylindrical sleeve valve formed with a driving projection, a layshaft, a link member extending substantially tangentially of the sleeve valve, said link member connecting the layshaft and sleeve projection, driving means for the layshaft for imparting an oscillatory movement to the sleeve about its axis, said link member being formed with spaced arcuate recesses, respectively concentric with the sleeve axis during portions of the sleeve valve cyclic travel.

6. A sleeve valve engine comprising a cylindrical sleeve valve formed with a driving projection, a link having a face bearing on said sleeve projection, means connecting one end of the link with the sleeve projection, driving means for moving the other end of the link longitudinally in opposite directions and in a direction substantially parallel with the sleeve axis, said link having spaced arcuate recesses bounding the bearing face, said recesses being respectively substantially concentric with the sleeve when the link is in its extreme opposite longitudinal positions whereby the first said means may be positioned relatively near the sleeve valve and still provide a relatively great bearing area between the sleeve projection and the said bearing face of the link as the sleeve valve is oscillated.

In witness whereof, I hereunto subscribe my name this 12th day of March, A. D. 1927.

WALTER A. FREDERICK.